(Model.) 2 Sheets—Sheet 1.

I. MESEROLE.
MILK COOLER.

No. 304,117. Patented Aug. 26, 1884.

Witnesses.
F. W. Lane
A. S. Brown

Inventor.
Isaac Meserole (Model.) 2 Sheets—Sheet 2.

I. MESEROLE.
MILK COOLER.

No. 304,117. Patented Aug. 26, 1884.

Witnesses.
F. W. Lane
A. S. Brown

Inventor.
Isaac Meserole
by
M. H. Doolittle
Atty

UNITED STATES PATENT OFFICE.

ISAAC MESEROLE, OF SPRINGVILLE, PENNSYLVANIA.

MILK-COOLER.

SPECIFICATION forming part of Letters Patent No. 304,117, dated August 26, 1884.

Application filed September 6, 1883. (Model.)

*To all whom it may concern:*

Be it known that I, ISAAC MESEROLE, a citizen of the United States, residing at Springville, in the county of Susquehanna and State of Pennsylvania, have invented certain new and useful Improvements in Milk-Coolers; and I do hereby declare the following to be a full, clear, and exact description of the invention, such as will enable others skilled in the art to which it appertains to make and use the same.

The object of my invention is to provide a milk-cooler in which milk may be kept cool, and also, when the cream rises, to separate the cream from the milk without skimming, and without removing the receptacles in which the milk is kept from the cooler, and, in addition, a gage for determining the amount of cream which is obtained after the milk and cream are separated; and my invention consists in such an arrangement of the various parts of the milk-cooler that the above-mentioned objects may be accomplished in the most convenient and thorough manner.

Figure 1:
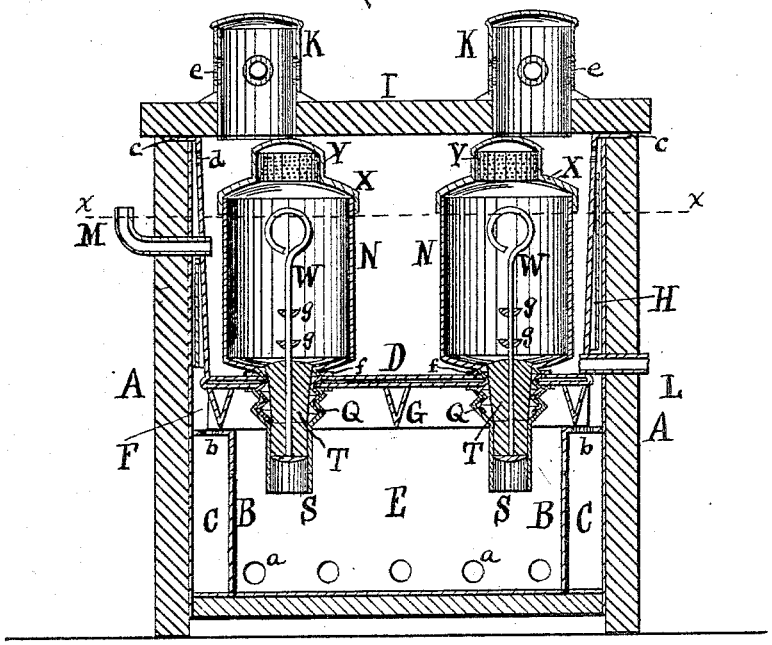
Figure 2:
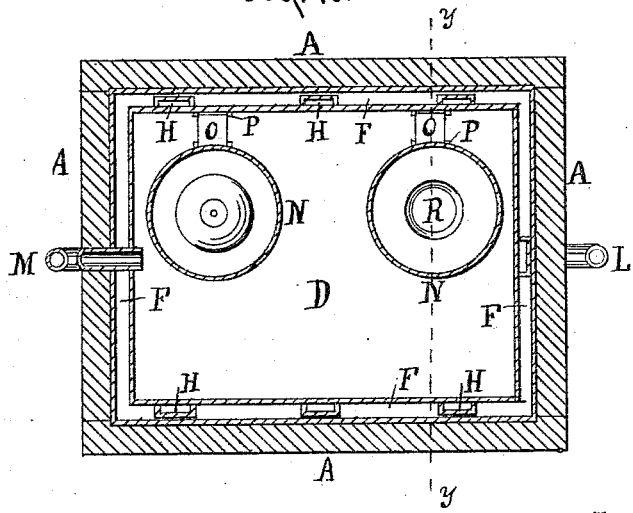
Figure 3:
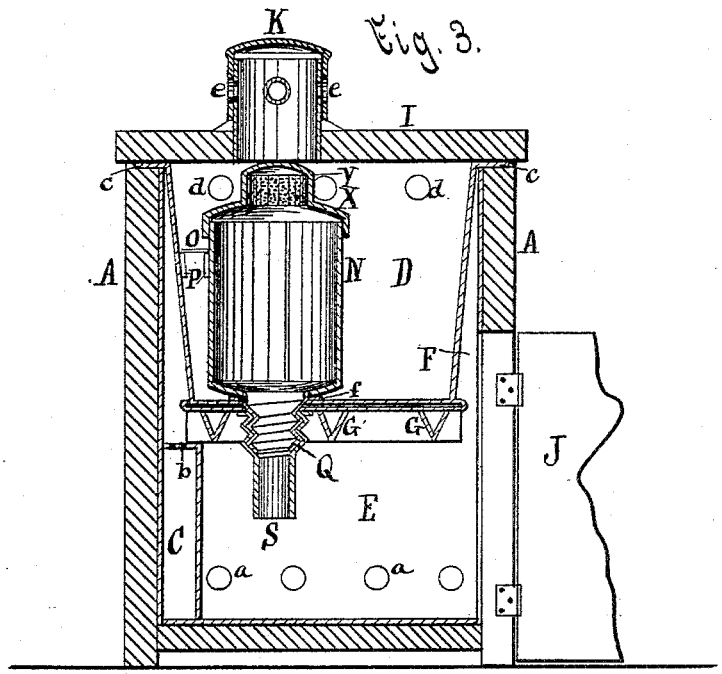
Figure 4:
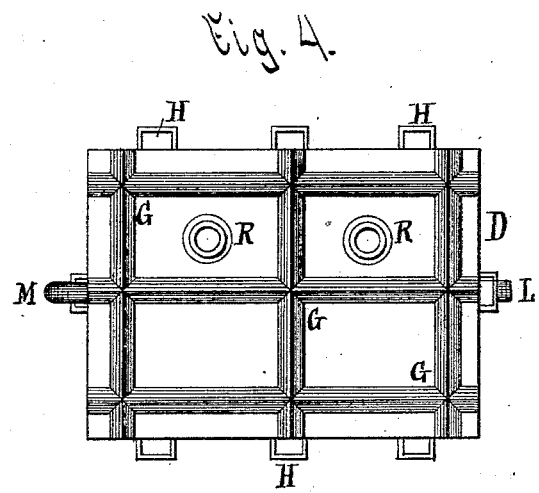

In the accompanying drawings, which illustrate my invention and form part of this specification, Figure 1 is a central vertical cross-section of my improved cooler. Fig. 2 is a horizontal section thereof in a plane indicated by the line *x x*, Fig. 1. Fig. 3 is a vertical cross-section in a plane indicated by the line *y y*, Fig. 2; and Fig. 4 is a bottom view of the tank or box in which the milk-receptacles are contained.

Like letters designate corresponding parts in all the figures.

In the drawings, A A represent the walls of the refrigerator-box, which are made in the ordinary manner, to exclude the external heat. The lower part of the cooler has interior linings, B B, closed at the top, which inclose air-spaces C C, which communicate near the bottom with the interior of the cooler by air-holes *a a*, and have also air-holes *b b* in the top, communicating with the spaces above the linings B B.

A removable tank or box, D, is let down into the cooler, and is held in position by flanges *e e*, which rest in recesses on the walls of the cooler. This tank is not as deep as the interior height of the cooler, so that when it is in position a chamber, E, is formed in the lower part of the cooler. The tank does not fit tightly in the interior of the cooler, but when let down air-spaces F F are formed on every side between the tank and the sides of the cooler, which communicate with the spaces C C, surrounding the chamber E, through the apertures *b b*, and with the interior of the tank by apertures *d d* near the top of the tank. The bottom of the tank is constructed with ridges G G, which strengthen the tank, and are made hollow to assist in the circulation of the air. The sides and ends of the tank are formed with projecting hollow boxes H H, open at top and bottom, which both strengthen the tank and assist in the circulation of the air. When the tank is let down in the refrigerator-box, its bottom just touches the tops of the linings B B, so that the air-spaces C C F F entirely surround the tank and the chamber E, which, with the double walls, form a double protection from the heat of the external air.

The cover I of the cooler is provided with ventilators K K, which are formed with apertures *e e*, for the escape of the air from the interior. A suitable door, J, communicates with the chamber E.

The tank D may be filled with ice or cold water for the cooling purposes. A discharge-pipe, L, near the bottom is provided to carry off the water, and an overflow-pipe, M, near the top prevents the tank being filled too full. These pipes L and M pass through the walls of the cooler and the tank, and are made easily removable, so as not to interfere with the removal of the tank from the cooler when it is desired to take out the tank for cleaning, &c. The refrigerating material, besides keeping the tank and its contents cool, keeps up a constant circulation of air in the chamber E, the cold air constantly descending into said chamber and the warmer air ascending, the circulation taking place through the air-spaces C C F F, surrounding the tank and chamber.

In the tank are placed the receptacles or cans N N, in which the milk is put, two of these cans being shown in the drawings, though it is obvious that any convenient number may be used. These cans are secured to the side of the tank by double hooks O O, which are adapted to fit in pockets P P, as shown, on the sides of the tank and the cans. This method of securing the cans is convenient, because, in addition to holding the cans securely in position, their easy and ready removal is permitted. Each can N is formed with a funnel, Q, at its bottom, which passes through a suitable opening, R, in the bottom of the tank. This funnel is screw-threaded, as shown, and a short pipe, S, is screwed on from underneath the tank, thus firmly securing the can in position. A suitable packing-ring, $f$, is placed around the funnel Q, so that when the can is secured by the pipe S there can be no leaking or dripping from the tank to the chamber beneath. A stopper, T, is provided for each can, fitting water-tight in the mouth of the funnel Q, so that when it is desired to empty the can by lifting the stopper the milk will run down into a suitable vessel placed for that purpose in the chamber below, the pipe S assisting in conducting the milk properly.

One of the objects of this invention, as above stated, is the separation of the cream from the milk without skimming, and this is perfectly accomplished by the construction of the cans already described.

When the cream has risen, the stopper T is lifted, and the milk, being at the bottom, runs out. The stopper is to be lifted only a little distance, so that, while allowing the milk to flow freely, it will not permit the cream to escape, and when the flow of the milk has stopped the stopper is let down and the separation is completed; or the proper time for inserting the stopper may be determined by observing the milk as it runs into the vessel below.

For raising and lowering the stopper I prefer the device shown. This consists of a rod, W, attached to the stopper, and terminating in a handle near the top of the can. On this rod may be marked a properly-graduated scale— say by a series of projections or knobs, $g\,g$, as shown—so that the quantity of cream obtained may be determined at a glance; also, this graduated scale may be used to indicate the proper time for stopping the flow of the milk, in order to retain the cream in the can. If the quantity of cream which will rise is approximately known when the milk has so far run out that the gage indicates this amount in the can, the stopper is replaced and the cream is retained.

The cans are supplied with suitable covers, X X, which are provided with perforated ventilators Y Y, which assist in keeping the milk sweet.

What I claim as my invention is—

1. In a milk-cooler, a refrigerator-box formed with a lining, B, inclosing a lower chamber, E, surrounded by air-spaces C C, communicating therewith, in combination with a cooling-tank, D, and the milk-receptacles N N, said tank being inserted in said refrigerator-box, whereby a set of air-spaces, F F, are formed between said tank and said refrigerator-box, communicating with the tank and with the air-spaces C C, surrounding the lower chamber, E, substantially as and for the purpose herein specified.

2. In a milk-cooler, a tank adapted to hold the cooling material and the milk-receptacles, formed with hollow and open ridges or boxes on its sides and bottoms, whereby a free circulation of air around said tank is attained, substantially as set forth.

3. In a milk-cooler, the combination of a refrigerator-box formed with a lining, B, a lower chamber, E, inclosed by said lining and surrounded by air-spaces C, the removable tank D, the bottom of which is provided with hollow ridges G G and surrounded by the air-spaces C C and F F, the hollow boxes H H, the pipes L and M, the cans N, secured to the side of the tank D by hooks O, fitting in pockets P, and each provided with funnels Q, passing through openings R in the bottom of said tank, pipes S, screwed onto said funnels from underneath the tank, stoppers T to close said funnels, and upwardly-extending rods and handles W, attached to said stopper and provided with knobs $g$, substantially as described.

In testimony whereof I affix my signature in presence of two witnesses.

ISAAC MESEROLE.

Witnesses:
 E. R. W. SEARL,
 W. J. McCAUSLAND.